United States Patent [19]
Croft

[11] Patent Number: 4,759,338
[45] Date of Patent: * Jul. 26, 1988

[54] BARBECUE COVER SUPPORT DEVICE

[76] Inventor: Donald W. Croft, 4118 Kane St., San Diego, Calif. 92110

[*] Notice: The portion of the term of this patent subsequent to Apr. 29, 2003 has been disclaimed.

[21] Appl. No.: 44,061

[22] Filed: Apr. 29, 1987

[51] Int. Cl.⁴ .............................................. F24B 3/00
[52] U.S. Cl. ................... 126/25 R; 126/25 A; 126/25 AA; 126/41 R; 292/338
[58] Field of Search ............. 126/25 A, 25 R, 25 AA, 126/27, 37 A, 211, 197; 220/85 CH; 292/288, 338, 339, 342; 248/351, 356, 354 R

[56] References Cited
U.S. PATENT DOCUMENTS

| | | | |
|---|---|---|---|
| 2,520,578 | 8/1950 | Treloar | 126/25 R |
| 2,792,773 | 5/1957 | Barker | 126/9 R |
| 2,921,175 | 1/1960 | Zaidan | 126/41 R |
| 3,320,942 | 5/1967 | Christensen | 126/25 C |
| 3,413,935 | 12/1968 | Behrns | 126/25 R |
| 3,834,745 | 9/1974 | Coates | 292/288 |
| 3,938,495 | 2/1976 | Bauer et al. | 126/41 R |
| 4,026,266 | 5/1977 | Cremer | 126/25 A |
| 4,046,132 | 9/1977 | White | 126/25 A |
| 4,120,237 | 10/1978 | Mecherlen | 126/25 A |
| 4,192,283 | 3/1980 | Kridler et al. | 126/25 AA |
| 4,256,080 | 3/1981 | Seach | 126/25 R |
| 4,422,435 | 12/1983 | Spell | 126/25 B |
| 4,430,985 | 2/1984 | Huneycutt | 126/25 A |
| 4,457,290 | 7/1984 | Edwards | 126/25 A |
| 4,476,849 | 10/1984 | Schmidt | 126/25 R |
| 4,584,984 | 4/1986 | Craft | 126/25 R |

FOREIGN PATENT DOCUMENTS 383352 11/1932 United Kingdom ............. 126/41 R

Primary Examiner—Larry Jones
Attorney, Agent, or Firm—Brown, Martin, Haller & Meador

[57] ABSTRACT

A device for supporting the hinged cover of a barbecue brazier partially open in any one of a plurality of selected positions comprises an elongated planar support member having a plurality of upwardly orientated cover hooks along its length for selectively engaging the rim of the partially opened cover, and a downwardly facing mounting member or hook adjacent one of its ends for mounting the support member vertically on the rim of the brazier. A handle member is permanently or removably attached to the support member for handling the support member when it has become hot through use. The handle member in one embodiment is secured to the support member by means of a screw threaded projection on the handle member which engages a screw threaded bore in the support member.

8 Claims, 1 Drawing Sheet

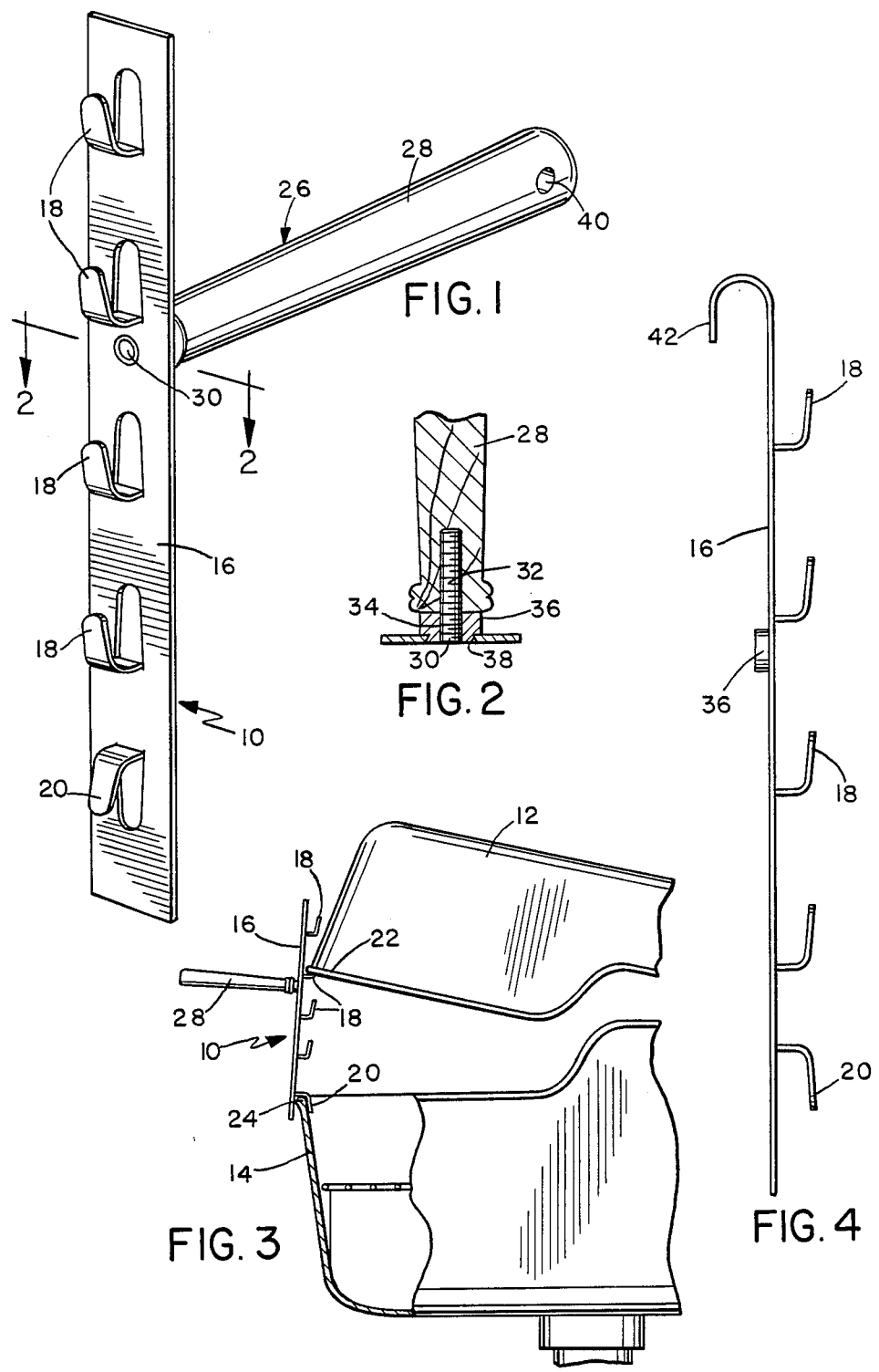

BARBECUE COVER SUPPORT DEVICE

BACKGROUND OF THE INVENTION

The present invention relates generally to barbecues for outdoor cooking and more specifically to a support device for supporting the cover of a barbecue of the type in which the cover is hinged to the rear edge of the barbecue brazier.

In my U.S. Pat. No. 4,584,984 entitled "Barbecue Cover Support Device", dated Apr. 29, 1986, a barbecue cover support device is described in which a planar support member has a plurality of spaced retaining hooks facing in one direction parallel to the support device projecting from one of its faces, and a brazier hook facing in the opposite direction adjacent one of its ends. The brazier hook is designed to be mounted on the rim of the brazier, while the rim of the cover can be engaged in a selected one of the retaining hooks to hold the cover partially open in a selected position. A tool having a heat insulated handle is loosely fittable in a rectangular through slot in the support member for manipulating the support member when hot. However, this still poses some problems in avoiding all contact with the support member when hot.

SUMMARY OF THE INVENTION

It is an object of the present invention to provide a barbecue cover support device which can be handled relatively easily to manipulate it during use and to remove it from the barbecue when hot and place it in a storage location until needed.

According to the present invention a support device for supporting a hinged barbecue cover in a selected, partially open position comprises an elongated, planar support member, suitably of metal, which is mountable vertically between the brazier and the cover. The support member is formed with a brazier hook at or adjacent one end which fits over the rim of the brazier, and a plurality of upwardly oriented cover retaining hooks spaced along the length of the support member for selectively receiving and supporting the rim of the brazier cover. The brazier hook faces in the opposite direction to the retaining hooks, and the hooks are formed of cut-out strips of the support member which are formed to project first outwardly and then parallel to the support member in the appropriate direction.

A handle member having a heat-insulated handle extending from one end is rigidly secured to the support member so that it projects outwardly from one of its faces. The handle member may be permanently attached to the support member, or releasably secured to it via a screw threaded engagement. In one embodiment the handle member has a screw threaded shaft at the opposite end to the handle which engages in a corresponding screw threaded bore in the support member. The handle member allows positioning and adjustment of the support member safely on the barbecue when it becomes hot during use, and also allows the hot support member to be removed to a storage location safely after use.

The support member may have a hook formed at one end for hanging the support member to depend from the rim of the barbecue when not in use. This ensures that the member is in a suitable accessible location ready to use at all times. In the preferred arrangement, the hook is formed by suitably shaping one end of the support member, preferably the opposite end to the brazier hook, and projects in the opposite direction to the cover retaining hooks. This means that the cover retaining hooks may also be used for hanging other barbecue tools such as forks, spatulas, and the like while not in use.

BRIEF DESCRIPTION OF THE DRAWINGS

The present invention will be better understood from the following detailed description of some preferred embodiments of the invention, taken in conjunction with the accompanying drawings, in which like reference numerals refer to like parts and in which:

FIG. 1 is a perspective view of the complete support device with attached handle according to a first embodiment of the invention;

FIG. 2 is an enlarged sectional view taken on line 2—2 of FIG. 1;

FIG. 3 is a side elevation view of a portion of a barbecue showing the support device is use; and FIG. 4 is a side elevation view of an alternative support device with a hanger hook.

DETAILED DESCRIPTION OF THE DRAWINGS

FIGS. 1 to 3 of the drawings show a barbecue support device 10 according to a first embodiment of the present invention. FIG. 3 shows the device 10 in use holding the cover 12 of a barbecue brazier 14 in a selected partially open position. In the barbecue illustrated in FIG. 3, the brazier 14 and cover 12 are connected together by hinges (not shown) along a rear joint line between the two members, and may be mounted on a suitable vertically supporting member or pedestal (not shown) for holding the brazier at a suitable height for cooking. The device 10 may be used with any design of barbecue in which the cover is hinged to the brazier.

As best seen in FIG. 1, the support device 10 comprises an elongated planar support member 16 which is preferably a metal bar of suitable dimensions. The dimensions may, for example, be similar to those described in my U.S. Pat. No. 4,584,984 referred to above. A plurality of spaced cover retaining hooks 18 are formed to project from one face of the support member and face in a first direction parallel to the support member. A single brazier hook 20 projects from the support member adjacent one end of the member and faces in the opposite direction to the retaining hooks 18. In the embodiment shown hook 20 projects from the same face of the support member as the retaining hooks, but it may alternatively project from the opposite face.

The barbecue cover retaining hooks 18 are cut from the metal of the support member and bent to project outwardly and then parallel to the support member in a first direction, and the brazier hook is also cut from the metal of the support member in the same way and bent to project outwardly and then parallel to the support member in the opposite direction to the retaining hooks 18. In the embodiment shown in FIG. 1, four cover retaining hooks are provided spaced equidistantly from one another along the length of the support member for providing selectable points of retention to the rim 22 of the cover 12, as illustrated in FIG. 3. This provides four different partial openings of brazier 14. However, a greater or lesser number of hooks 18 may be provided in alternative arrangements.

In use the lower, brazier hook 20 is engaged over the front rim 24 of the brazier while the rim 22 of the cover is engaged in the selected retaining hook 18 as shown in FIG. 3 to provide the desired partial brazier opening. A handle member 26 is rigidly secured to the support member to project from it in the opposite direction to the hooks 18 as shown in FIGS. 1 and 3, and has a heat insulated handle 28 extending from one end for manipulating the support member safely when hot. The handle is of a suitable insulating material such as wood, plastic or the like.

The handle member may be permanently attached to the support member, but in the preferred embodiment illustrated the handle member has a projecting shaft portion 30 having external screw threads 32 which engage in corresponding internal screw threads in a bore 34 extending through a cylindrical extension piece or rivet-type nut 36 mounted in bore 38 in the support member. Alternatively, a screw-threaded projection from the support member may engage in a screw threaded bore at the end of the handle 28. The handle 28 has a through bore 40 adjacent its free end through which a suitable string or wire loop can extend for hanging the handle from one of the hooks 18 when the device is not in use.

The handle 28 allows the support member to be manipulated and adjusted safely when hot. The support member may be urged towards or away from the cover while mounted on brazier rim 20 using the handle 28 in order to position the rim 22 in a selected cover retaining hook, or to move the rim from one hook to another to alter the spacing appropriately during use. Additionally, the handle allows the support member to be safely removed from its cover supporting position to a storage location or for cleaning after use. During storage the handle member may be removed from the support member so that it takes up less space, and may be hung from one of the support member hooks via a suitable line or string extending through bore 40 if desired.

In the modified embodiment of the invention illustrated in FIG. 4, the support member is similar to that shown in FIGS. 1 to 3 and like reference numerals have been used for like parts. The support member is associated with a handle as in the first embodiment, but this is not shown in FIG. 4 for reasons of clarity. In the embodiment of FIG. 4, support member 16 has downturned hanger hook 42 at one end which is preferably formed by bending down the end portion of member 16 to form a U-shaped hook-like shape as shown. Hanger hook 42 can be used for hanging the member 16 from the rim 24 of brazier 14 when not in use, so that it is always readily available during cooking if the cook wishes to prop the cover in a partially open position. Additionally, when the member 16 is hung from the rim, the hooks 18 may optionally be used for hanging other barbecue tools such as forks, prongs, spatulas and the like in a readily accessible location, as well as for hanging the handle member 26 when not in use.

Although some preferred embodiments of the present invention have been described above by way of example only, it will be understood by those skilled in the field that modifications may be made to the disclosed embodiments without departing from the scope of the invention, which is defined by the appended claims.

What is claimed is:

1. A support device for securing the cover of a barbecue in a partially opened position with respect to an underlying brazier comprising:
   an elongated planar support member having a first and second end;
   a plurality of cover retaining hooks spaced along the length of said support member for receiving and supporting the rim of the barbecue cover;
   each of said retaining hooks being cut from said support member and formed to project first outwardly from said support member and then generally parallel to the plane of said support member toward said first end of said support member;
   a brazier hook cut from said support member between said second end and said retaining hooks for engaging over the rim of the brazier, said brazier hook being formed to project first outwardly from said support member and then generally parallel to the plane of said support member toward said second end thereof; a handle member having a heat insulated handle; and
   securing means for rigidly securing said handle member to said support member.

2. A device as claimed in claim 1, wherein said securing means comprises a screw threaded portion projecting from said handle for releasable screw threaded engagement with said support member.

3. A device as claimed in claim 2, wherein said support member has a screw threaded through bore and said screw threaded portion projecting from said handle comprises a shaft having external screw threads for engaging in said bore.

4. The device as claimed in claim 3, including a nut member mounted is said support member to project from one of its faces, said through bore being formed in said nut member.

5. The device as claimed in claim 1, wherein said handle member is permanently attached to said support member.

6. The device as claimed in claim 1, wherein said support member has a hanger hook at one end for hanging the support member to depend from the rim of the brazier when not in use.

7. The device as claimed in claim 6, wherein the hanger hook comprises a downturned portion at said first end of said support member projecting in the opposite direction to said cover retaining hooks.

8. The device as claimed in claim 1, wherein said handle has a transverse through bore for hanging if from a support when not in use.

* * * * *